United States Patent [19]

Hodgman et al.

[11] Patent Number: 4,577,144
[45] Date of Patent: Mar. 18, 1986

[54] BATTERY CHARGING SYSTEM INCLUDING MEANS FOR DISTINGUISHING BETWEEN RECHARGEABLE AND NON-RECHARGEABLE BATTERIES

[75] Inventors: John S. Hodgman; Ferdinand H. Mullersman, both of Gainesville, Fla.

[73] Assignee: General Electric Company, Gainesville, Fla.

[21] Appl. No.: 659,916

[22] Filed: Oct. 11, 1984

[51] Int. Cl.[4] .............................. H02J 7/00
[52] U.S. Cl. .............................. 320/2; 320/3; 320/21; 320/48
[58] Field of Search .............................. 320/2–5, 320/20–24, 35, 36, 48; 429/7, 10, 92, 93, 96, 97

[56] References Cited

U.S. PATENT DOCUMENTS

| | | | |
|---|---|---|---|
| 3,070,748 | 12/1962 | Worobey et al. | 325/492 |
| 3,506,902 | 4/1970 | Sullivan | 320/2 |
| 3,622,396 | 11/1971 | Fernandez et al. | 250/215 X |
| 3,665,285 | 5/1972 | Mullersman et al. | 320/2 |
| 3,675,108 | 7/1972 | Nicholl | 320/2 |
| 3,816,807 | 6/1974 | Taylor | 320/48 X |
| 4,044,300 | 8/1977 | Dupuis et al. | 320/48 X |
| 4,147,163 | 4/1979 | Newman et al. | 320/2 X |
| 4,147,838 | 4/1979 | Leffingwell | 320/2 X |
| 4,213,079 | 7/1980 | Mullersman | 320/2 |
| 4,229,686 | 10/1980 | Mullersman | 320/2 |
| 4,288,733 | 9/1981 | Bilanceri et al. | 320/2 |
| 4,310,606 | 1/1982 | Maida | 320/48 X |
| 4,363,407 | 12/1982 | Buckler et al. | 209/3.13 |
| 4,382,219 | 5/1983 | Holme et al. | 320/2 |
| 4,453,119 | 6/1984 | Staler et al. | 320/39 |

Primary Examiner—R. J. Hickey
Attorney, Agent, or Firm—Henry J. Policinski

[57] ABSTRACT

A battery charging system is provided which distinguishes between primary and secondary batteries by sensing a charging or discharging parameter of a battery placed into the system. A sensing means is included in the system which senses the value of at least one parameter of the battery. The parameter has a value for secondary batteries which is distinctive from its value for primary batteries. In response to an indication from the sensing means that the battery in the system is a primary battery, an enabling means disables charging of the primary battery by the system. The enabling means, in response to an indication from the sensing means that the battery in the system is a secondary battery, enables charging of the secondary battery by the system. One battery parameter which is particularly useful in discriminating between primary and secondary batteries is the low frequency impedance of the battery during charging.

19 Claims, 2 Drawing Figures

4,577,144

BATTERY CHARGING SYSTEM INCLUDING MEANS FOR DISTINGUISHING BETWEEN RECHARGEABLE AND NON-RECHARGEABLE BATTERIES

FIELD OF INVENTION

This invention relates to rechargeable batteries, and more particularly to a system for recharging rechargeable, or secondary, batteries but preventing the recharging of non-rechargeable, or primary, batteries.

BACKGROUND

There are available to the consumer an ever-increasing number of portable battery operated devices which create an ever-increasing demand for batteries to serve as power sources. Conventionally, primary batteries such as LeClanche' carbon-zinc, zinc chloride or alkaline batteries have been used as power sources in many applications including consumer products. However, these primary batteries are typically not designed for recharging, and they must be replaced with new batteries as the old ones are drained.

Nickel-cadmium batteries, which can repeatedly be recharged and reused for a significant number of charge/discharge cycles, are now available to replace most common primary batteries. Such nickel-cadmium batteries may be made with terminals and case configurations and sizes identical to primary batteries so as to be usable in the relatively large number of products designed for primary batteries. Nickel-cadmium batteries may also be associated with battery chargers for providing energy to recharge the nickel-cadmium batteries. By providing chargers for nickel-cadmium batteries having the same size and shape configuration as primary batteries, there is a risk that a consumer may insert primary batteries into the charger, even though such primary batteries are not intended to be recharged. Many primary batteries, if subjected to charging current, will eventually release electrolyte which can corrode and damage the product in which the battery resides. Charging of such primary batteries may also produce other adverse effects.

In prior art approaches, in order to provide for charging of nickel-cadmium batteries while avoiding the adverse effects associated with recharging primary batteries, the nickel-cadmium batteries have been made of special size or shape to distinguish them from the non-rechargeable or primary batteries so that only the rechargeable battery will physically fit into a charger for recharging. Other prior art approaches have provided the rechargeable battery with a third contact terminal (in addition to the two contact terminals used to discharge energy from the battery) which is used to charge the battery. A non-rechargeable battery not having the third charging contact terminal cannot be charged in the charger. Another prior art approach provides for the insertion of a uni-directional current flow device into the non-rechargeable battery so that current may flow from the battery during discharge but cannot flow through the battery in the reverse direction during charging. Each of these prior art approaches has not proved to be entirely satisfactory at least for the reason that they each involve additional or special parts or components and hence increase the cost of the battery.

SUMMARY OF THE INVENTION

It is the primary object of the present invention to provide a rechargeable battery system which eliminates the possibility of supplying a charging current to a non-rechargeable battery for an extended period of time.

It is another object of the present invention to provide a battery charging system of this kind for recharging nickel-cadmium batteries having terminal and case configurations identical to primary batteries.

It is still another object of the present invention to provide a battery charging system for fully charging batteries only if the batteries inserted are of a rechargeable type.

It is yet another object of the present invention to provide a battery charging system as characterized above that discriminates between a rechargeable battery and a primary battery by measuring the value of a predetermined battery parameter.

Other objects and advantages will become apparent from the following detailed description when taken into conjunction with the drawings.

In accordance with one embodiment of the present invention, there is provided a battery charging system adapted to distinguish between rechargeable and non-rechargeable battery types by sensing a predetermined battery parameter inherent in both types, wherein both of the battery types are of substantially similar size and have first and second external load terminals for delivering electrical energy to an energy-using device. The battery charging system includes the following: (1) a battery charging circuit having a first non-charging mode and a second charging mode and also having first and second charging contacts arranged for engagement with the first and second external load terminals, respectively, when a battery is inserted in the charger, (2) a sensing means for sensing at least one inherent parameter of a rechargeable battery whose value is distinguishable from the value of an equivalent inherent parameter of a non-rechargeable battery, and (3) an enabling means responsive to the sensing means for disabling the charging circuit in response to an indication from the sensing means that the sensed charging parameter has a value indicative of a non-rechargeable battery.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
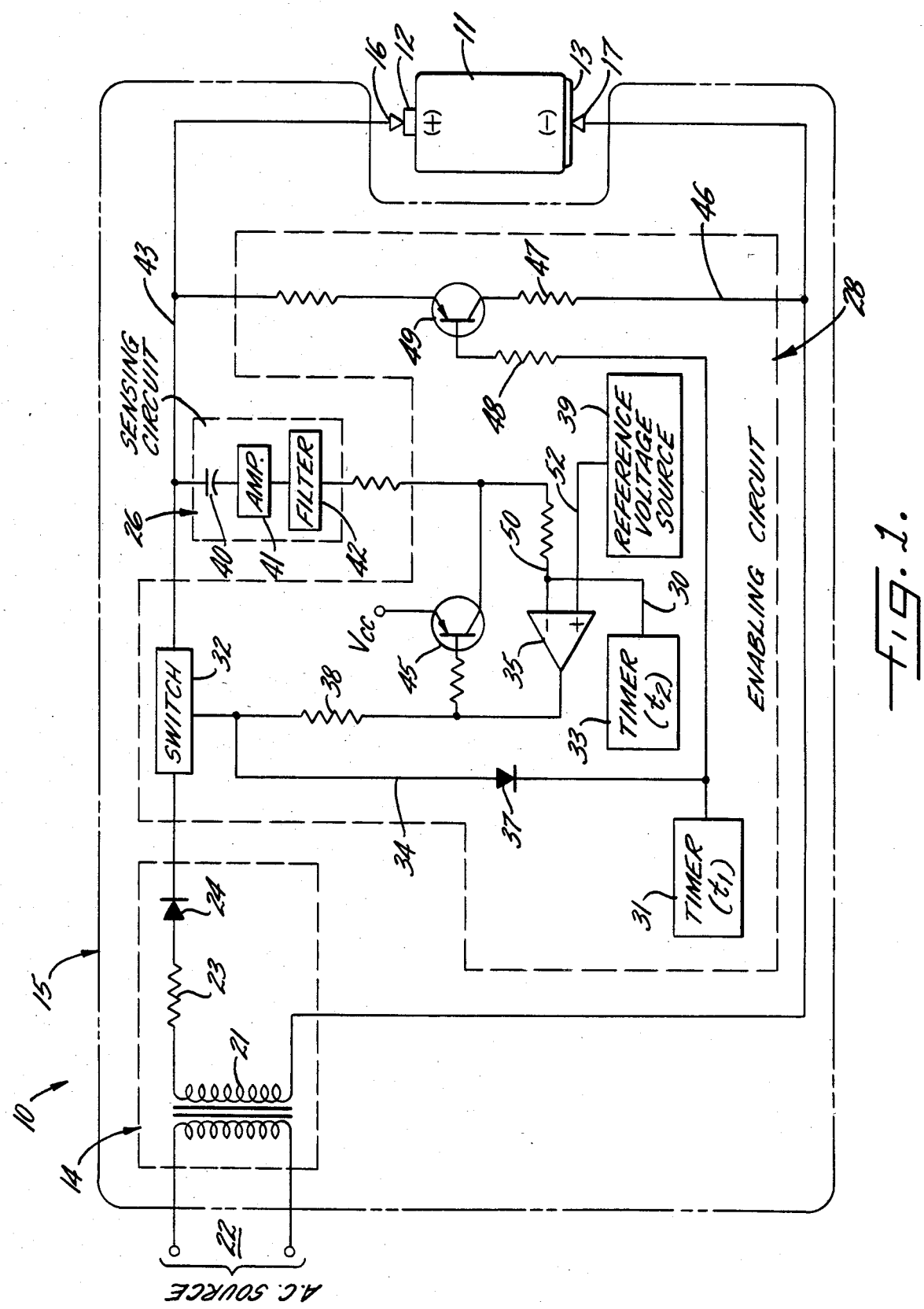
FIG. 1 is a schematic diagram of a battery charging system according to a first embodiment of the invention.

Referring first to FIG. 1, a battery charging system includes a charging device, shown generally at 10, and a conventional primary or secondary battery 11 (e.g., a nickel-cadmium AAA, AA, C, D or nine volt size battery). The battery 11, illustrated as a standard cylindrical cell, has first and second external load terminals 12, which is the positive terminal, and 13, which is the negative terminal. Terminals 12 and 13 are provided for the purpose of connecting the cell or battery to an energy-using device for the delivery of electrical energy thereto. The charging device 10 includes a case 15 for receiving the battery 11 and first and second charging contacts 16 and 17 arranged to electrically contact the battery load terminals 12, 13 when the battery 11 is received in the case 15. Within the charging device 10 is a charging source 14 having a transformer 21 adapted to be coupled to a conventional a-c line 22, an impedance 23 to control the charging current, and a diode 24 for half-wave rectification.

In order to prevent charging of a primary (i.e., non-rechargeable) battery by the charging system, it is desireable to identify inherent battery parameters, common to both a primary and a secondary (i.e., rechargeable) battery, but whose value is indicative of whether the battery 11 is a secondary battery or a primary battery of corresponding physical size and shape. A number of battery parameters are common to both primary and secondary batteries and for certain conditions of the batteries, the value of the parameter for the secondary battery bears a certain relationship with the value of the same parameter for the primary battery. Unfortunately, this relationship is not constant for all field conditions which might be associated with the primary or secondary batteries. Hence, a charging system which disregards the condition of the battery and uses the values of the parameters to distinguish between primary and secondary batteries will not properly distinguish between the batteries under all conditions.

For example, for certain states of charge, the voltage of a primary battery is higher than the voltage of a secondary battery. Accordingly, a charging system could be devised which uses the measured value of the voltage parameter to distinguish between the primary and secondary batteries. Such a system, could simply compare the measured voltage level of any battery inserted into the charger, with a voltage reference or threshold and then enable charging only for measured voltage values below the threshold. Unfortunately, however, if the state of charge of the primary battery is low, then the voltage of the primary battery could be below the voltage of the threshold voltage. Accordingly, if the charging system fails to consider the state of charge of the batteries and simply uses voltage value as the criteria to make a charge/no-charge decision, then the charging system may effect charging of a primary battery.

As another example, the value of the internal resistance or the low frequency impedance $Z_{lf}$ (e.g., the impedance in the battery at household line frequency) is, for certain states of charge, lower for a secondary battery than the value of the same parameter for a primary battery. Accordingly, a charging system could be devised which uses the value of either the internal resistance or the low frequency impedance to distinguish between a primary and secondary battery. Again, such a system could simply compare either the internal resistance or the low frequency impedance of any battery inserted into the charger with a value representing a threshold internal resistance or a threshold low frequency impedance and then enable the charging mode only for measured values of internal resistance or impedance less than the threshold value. Unfortunately, however, the internal resistance or low frequency impedance for a secondary battery increases significantly when the battery is in a very low state of charge condition and particularly when stored in this condition for an extended period of time. Accordingly, if the threshold value is set low enough to discriminate between primary and secondary batteries at low (but not very low) states of charge, the charging system will not initiate charging of a secondary battery in a very low state of charge condition. It is obvious therefore that if the charge system fails to consider the state of charge of the battery and simply uses a value of either internal resistance or low frequency impedance to make a charge/no-charge decision, then the charging system may not effect charging of a secondary battery. The present invention provides, among other features, for overcoming the aforementioned problems.

As stated above, for many state of charge conditions a secondary battery has both a lower effective internal resistance and a lower low frequency impedance in comparison to primary battery cells. Therefore either of these parameters present a basis for discrimination between primary and secondary batteries. Unfortunately, the internal resistance and low frequency impedance of a secondary battery rises substantially when the battery is stored for an extended period of time at a very low state of charge. However, it has been found that by providing small amounts of charging current to certain secondary batteries (such as nickel-cadmium batteries) at a very low charge state, the internal resistance and low frequency impedance of the battery markedly decreases. The charging current need only be applied for a relatively short period of time in order to achieve the reduction in internal resistance and low frequency impedance. Accordingly, by applying a limited amount of charge current to the secondary battery before the comparison of the measured value of either internal resistance or low frequency impedance is compared to the reference value, the aforementioned problem can be overcome.

In accordance with the invention, after charging current has been delivered for a short period of time to a battery inserted into charging device 10, the charging device 10 is switchable between a charging mode and a non-charging mode. Whether charging device 10 proceeds in a charging mode or non-charging mode is determined by sensing circuit 26 and enabling circuit 28 each electrically connected to the charging source 14 and the battery 11. Sensing circuit 26 senses the value of a predetermined inherent parameter common to both a primary and secondary battery. The parameter is selected so that the value of the parameter for a rechargeable battery is distinguishable from the value of the same parameter for a non-rechargeable battery. Furthermore, the parameter may be sensed by sensing means 26 either directly or indirectly as will hereinafter be explained. Enabling circuit 28 compares the sensed value of the predetermined parameter with a predetermined reference value stored in the enabling circuit and controls the mode of the charging device 10 in response to the comparison. If the comparison of the sensed and the predetermined reference values of the parameter indicates that the battery 11 is a secondary battery, the charging device 10 is placed into a charging mode by the enabling circuit 28. Alternatively, if the comparison of the sensed value with the predetermined reference value indicates the battery is a primary battery, the charging device 10 is placed in a non-charging mode by the enabling circuit 28. Said another way, the enabling means or circuit 28 is responsive to the sensing means 26 to disable the charging mode of charging device 10 in response to an indication from the sensing means that the sensed value of the parameter is indicative of a primary battery. Conversely, the enabling means 28 is responsive to the sensing means 26 to enable the charging mode of charging device 10 in response to an indication that the sensed value of the parameter is indicative of a secondary battery.

As has been previously stated, low frequency impedance $Z_{lf}$ provides a basis for distinguishing between primary and secondary batteries. The low frequency impedance $Z_{lf}$ may be sensed or measured either directly or indirectly. With respect to an indirect sensing of low frequency impedance $Z_{lf}$ it has been found that the unfiltered rectified charge current from an alternating current source affords a basis for providing an indication of the value of the low frequency impedance. More specifically, when a typical consumer battery charger, connected to a source of alternating current at frequencies found in consumer households, is used to charge a battery, the low frequency impedance $Z_{lf}$ of the battery will interact with the time varying rectified current to produce a time varying component of voltage across the battery being charged. This varying voltage is typically called a ripple voltage. By sensing and measuring the voltage characteristics of the time varying ripple voltage of the battery over a period of time, the low frequency impedance $Z_{lf}$ is effectively sensed and measured and an indication of the low frequency impedance $Z_{lf}$ of the battery in the charging device may be obtained. While any one of a number of voltage characteristics of the ripple voltage may be measured in accordance with the present invention, the positive peak voltage of the ripple voltage or the average voltage of the rectified ripple voltage may be readily used to accomplish the purposes of the present invention. Hereinafter, reference to the term "value of the ripple voltage" shall refer to a value obtained by measuring one of the voltage characteristics of the ripple voltage.

The value of the ripple voltage is a function of the value of the low frequency impedance $Z_{lf}$. A greater value of impedance will cause a value of ripple voltage greater than the value of ripple voltage for a lower value of impedance. Accordingly then, monitoring of the ripple voltage characteristic of the battery will provide an indication of the value of the low frequency impedance of the battery inserted in the charging device which delivers a charge current of a generally preset magnitude. Since rechargeable batteries can be caused to have a lower value of low frequency impedance $Z_{lf}$ than primary batteries, the value of the ripple voltage for a rechargeable secondary battery will be lower than the value of the ripple voltage for a primary non-rechargeable battery. Hence, the value of the ripple voltage of a battery inserted into the charging device may be used to discriminate between secondary and primary batteries.

As will be hereinafter more fully explained, the present invention provides particular circuitry for sensing and measuring the value of ripple voltage appearing across the load terminals 12 and 13 during the charging of the battery 11 and for comparing that ripple voltage to a reference voltage. As a result of that comparison, a determination can be made as to whether the low frequency impedance of the battery in the charging system is indicative of a primary or secondary battery and, therefore, whether the charging mode or the non-charging mode should be effected for charging device 10.

As earlier stated, before comparing a measured value indicative of the low frequency impedance $Z_{lf}$ it is adviseable to provide charge current, for a short period of time, to any battery inserted into charging device 10. Application of charge current will insure that, if the inserted battery 10 is a secondary battery stored in a very low state of charge, the low frequency impedance of the battery will be reduced so that the value of the ripple voltage will be below the predetermined reference value or threshold.

Prior to the aforementioned comparison, it has also been found to be adviseable, although not necessary, to further enhance the difference between the value of low frequency impedance $Z_{lf}$ for a secondary battery and that of a primary battery. The difference in the value of the ripple voltage between a secondary battery and a primary battery can further be enhanced by discharging the battery 11 for a predetermined time period immediately prior to charging the battery. Such a discharge, while having relatively little effect on a secondary battery, will significantly increase the low frequency impedance $Z_{lf}$ and hence the ripple voltage of a primary battery.

The operation of the circuit shown in FIG. 1 will now be described in detail. The first step in the operation of the charging system provides for an initial period of discharge of any battery inserted into the charging device 10. Such a discharge will increase the ripple voltage of a primary battery and hence the reference value may be set to more readily facilitate distinguishing the primary battery from a secondary battery. As will hereinafter be more fully explained, when a battery is first inserted into charging device 10, a timer 31, electrically connected to switch 32 by line 30, causes switch 32 to block the delivery of charging current to the battery 11 for a time period $T_1$. For the same time period $T_1$, timer 31 also makes provision for a discharge path for the battery 11 through transistor 49.

More specifically, when a battery is inserted into charging device 10, timer 31 is reset such that its output is made conducting to ground. This grounded condition of timer 31 is maintained for a time period $T_1$ at the end of which the output of timer 31 is converted to an open circuit. However during the time period $T_1$, the grounded condition of timer 31 causes the input of switch 32 to be pinned at ground by virtue of the connection of timer 31 to switch 32 via conducting line 34. When the input to switch 32 is grounded, the switch 32 blocks the flow of charging current through line 43 and does not permit the flow of charging current to battery 11. Furthermore, in order to provide for the discharge of battery 11 during time period $T_1$, the grounded output of timer 31 is coupled through resistor 48 to the base of pnp transistor 49. With the output of the timer 31 at ground, the transistor 49 is turned on so as to conduct current through resistor 47 in line 46, thereby discharging the battery. At the end of time period $T_1$, timer 31 releases its output from ground, thereby permitting switch 32 to deliver charging current via line 43 to battery 11. Similarly, at the end of time period $T_1$ the release of the output of timer 31 from ground shuts off transistor 49 thereby terminating the discharge of battery 11. Accordingly, at the end of time period $T_1$, if the battery residing in the charging device 10 is a primary battery, the low frequency impedance $Z_{lf}$ has been increased by the discharge sequence and the presence of the primary battery may be more easily recognized by the charging system.

As stated above, insertion of a battery in the charging device 10 causes timer 31 to be reset. Insertion of the battery also causes timer 33 to be reset at the same instant whereby the output of timer 33 is made conducting to ground. This grounded condition of timer 33 is maintained for a period $T_2$ which is partially contemporaneous with, and longer in duration than, time period $T_1$. When time period $T_2$ has elapsed the output of timer 33 is converted to an open circuit. However, during the entire time period $T_2$, the initial grounded condition of the output of timer 33 clamps the inverting input of a comparator 35 to electrical ground via line 30 thereby making the output of comparator 35 high. While timer 33 causes the output of comparator 35 to be high during the entire time period $T_2$, during that portion of time period $T_2$ which is contemporaneous with time period $T_1$, the grounded connection between timer 31 and switch 32 prevents the high output of comparator 35 from causing switch 32 to be conducting. In order to protect the output of the comparator 35 when the input to switch 32 is pinned to ground through the diode 37, a resistor 38 isolates the output of comparator 35 from the grounded output of timer 31.

Upon the expiration of time period $T_1$, the time period $T_2$ has not yet fully elapsed and hence timer 33 is still causing the output of comparator 35 to be high. Since, at the expiration of time period $T_1$, the timer 31 has released the input of switch 32 from ground, the high output of the comparator 35 causes the switch 32 to permit the delivery of charging current to battery 11 for the remaining duration of time period $T_2$. Hence, during the time period $T_1$, the battery residing in charging device 10 is discharged and during the time period $T_2-T_1$ the battery is charged. As previously described, the discharge of the battery increases the low frequency impedance of the battery if it is a primary battery and charging of the battery lowers the low frequency impedance of a secondary battery in a very low state of charge. Each of these initial steps permit the inserted battery to be more easily recognized as either a primary or secondary battery.

During the timer period $T_2-T_1$, the output of the timer 33 causes the inverting input of the comparator 35 to be clamped to ground via line 30 independent and regardless of the value of the ripple voltage received via line 50 from the sensing circuit 26; thus, the output of the comparator 35 is held high and the switch 32 conducts charging current to the battery 11. When the time period $T_2$ has elapsed, the output of the timer 33 switches to open circuit and the sensed value of the ripple voltage from the sensing circuit 26 is provided to the inverting input of the comparator 35. By charging the battery 11 for the predetermined time period $T_2-T_1$, the low frequency impedance of a secondary battery, originally in a very low state of charge, is decreased whereby the sensing circuit 26 and enabling circuit 28 can be designed to more reliably discriminate between secondary and primary batteries.

After the time period $T_2$ has elapsed, the timer 33 releases the comparator 35 so as to allow the comparator to compare the sensed value of the ripple voltage from the sensing circuit 26 with a predetermined reference voltage from a reference source 39. After the timer 33 has released the comparator 35, if the sensed value of ripple voltage from the sensing circuit 26 is less than the reference voltage, a secondary battery is indicated. Accordingly, the output of the comparator 35 remains high, the switch 32 continues to conduct, and the charge current continues to be delivered to the battery 11. Alternatively, if the sensed value of the ripple voltage from the sensing circuit 26 is greater than the reference voltage, indicating a primary battery, the output of the comparator 35 becomes low, thereby turning off the switch 32 to prevent further charging of the battery 11.

When the output of the comparator 35 goes low (indicating a primary battery) a transistor 45 simultaneously turns on, thereby raising the voltage at the inverting input to the comparator 35 to the $V_{cc}$ voltage which is greater than the reference voltage. The $V_{cc}$ voltage from the transistor 45 latches the comparator 35 output into a low condition so that charge current cannot be reinitiated until the timer 33 is reset as a consequence of removing the battery 11 from the charging system and inserting another battery. Therefore, a primary battery will not receive charge current after the time period $T_2$ has elapsed.

Within the sensing circuit 26, the ripple voltage across the battery is a-c coupled through a capacitor 40 to a pulse amplifier 41 which amplifies only the positive going lobes of the ripple voltage. At the output of the pulse amplifier 41 the unipolar amplified pulses are filtered by a filter 42 to provide a dc value of ripple voltage which is delivered via line 50 to the inverting input of the comparator 35 within the enabling circuit 28. The dc sensed value of the ripple voltage delivered by sensing circuit 26 to the inverting input of the comparator 35 may correspond to either the approximate positive peak voltage or the average value of the rectified ripple voltage appearing across the terminals of the battery 11. Whether positive peak voltage, or average rectified voltage is provided depends upon the selection of one of many alternative filters 42 currently available in the art. Alternatively, sensing circuit 26 may include a root mean square detector known in the art whereby the dc sensed value of ripple voltage provided by sensing circuit 26 to comparator 35 will correspond to the value of the root mean square of the ripple voltage across the terminals of battery 11. In order to compare the value of the ripple voltage provided by the filter 42 with a predetermined reference, the reference voltage from the reference voltage source 39 is delivered to the non-inverting input of the comparator 35 via line 52. The reference voltage may be selected to correspond to the sensed value of ripple voltage associated with a low frequency impedance slightly less than that found in a non-rechargeable battery.

From the foregoing relationship between the timers 31 and 33, the battery 11 is first discharged for a period $T_1$ (less than $T_2$) and then charged for a time period $T_2-T_1$. Although the illustrative embodiment in FIG. 1 employs both timers 31 and 33, either of the timers may be used alone as a means for enhancing the difference in ripple voltage beween primary and secondary batteries. For example, in a modification of the embodiment illustrated in FIG. 1, the timer 31 is removed from the enabling circuit 28 thereby allowing the timer 33 to cause the battery 11 to be charged for a time period $T_2$ without regard to an indication from the sensing circuit 26 as to whether the battery is a secondary or a primary battery. By blocking the output of the sensing circuit 26 from reaching the comparator 35, the timer 33 causes the comparator to close the switch 32. Without the presence of timer 31, the timer 33 causes charging current to be delivered to the battery during the entire time period $T_2$.

Figure 2:
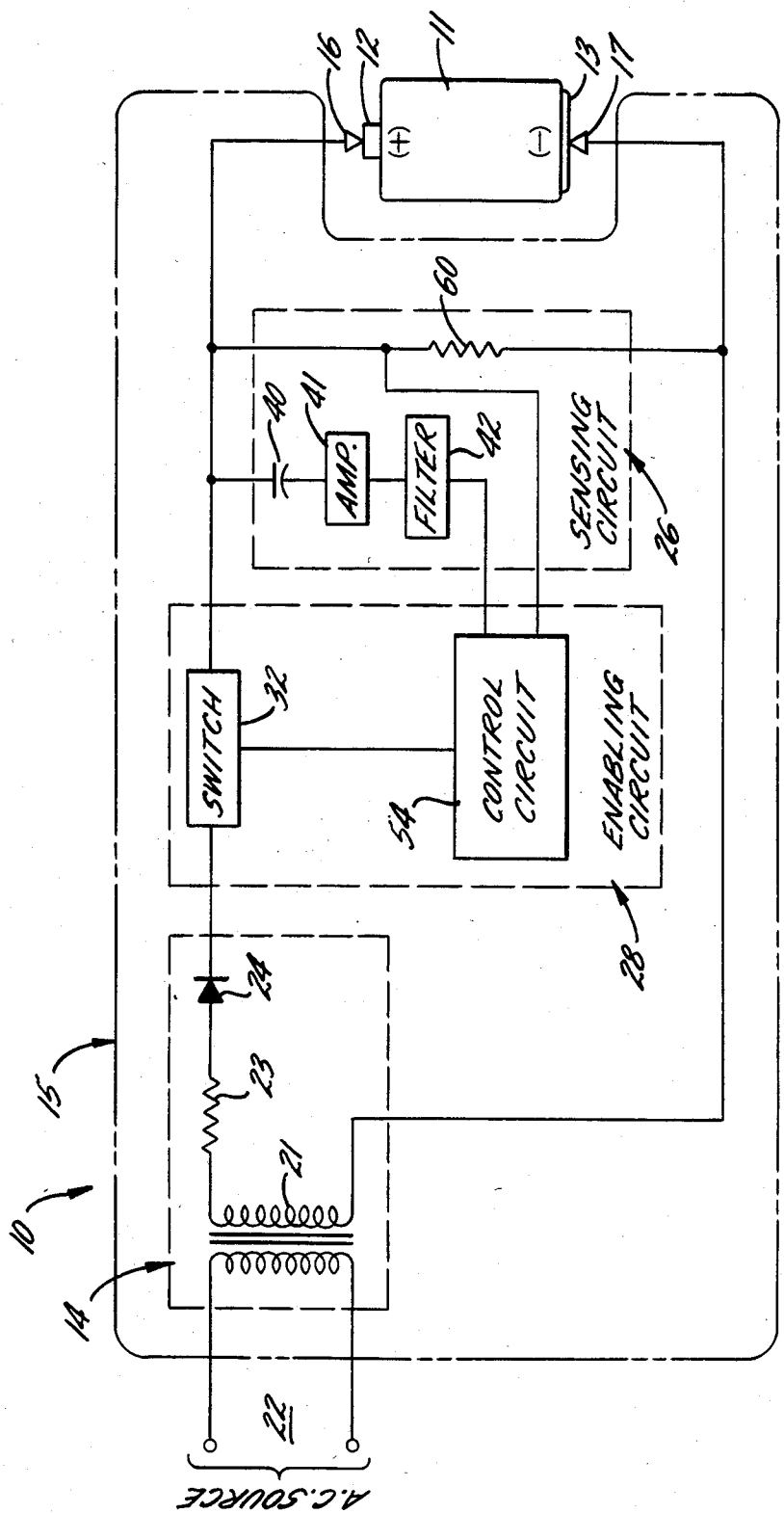
FIG. 2 is a schematic diagram of a battery charging system according to a second embodiment of the invention.

In accordance with an alternative embodiment of the invention illustrated in FIG. 2, a resistive load 60—which is part of the sensing circuit—is connected across the positive and negative terminals of the battery 11 in order to measure the voltage of the battery while it is being discharged. For nickel-cadmium secondary batteries, the discharge voltage is distinctly lower than the discharge voltage for corresponding fresh primary cells and hence may be used to distinguish secondary batteries from fresh primary batteries. Specifically, most common primary batteries of a cylindrical configuration (e.g., AAA, AA, C and D sizes) have a discharge voltage when fresh of about 1.50 volts. In contrast, similarly configured nickel-cadmium battery cells have a discharge voltage that is always less than 1.3 volts. Therefore, in the embodiment of the invention illustrated in FIG. 2, the resistive load 60 senses the discharge voltage of the battery 11.

The discharge voltage is delivered to a control circuit 54 included in the enabling circuit 28 where the value of the discharge voltage is compared to a predetermined reference voltage in order to determine if the discharge voltage is indicative of a primary battery or a nickel-cadmium secondary battery. If the comparison of the value of the discharge voltage with the predetermined reference voltage indicates that the battery 11 is a fresh primary battery, the control circuit 54 causes the switch 32 to block charging current from the charging circuit 10 to the battery 11.

When primary batteries which are partially discharged have discharge voltages less than the discharge voltages of nickel-cadmium secondary batteries, a sensing of the discharge voltage of the battery 11 is not a determinative test. Therefore, if the comparison by the control circuit 54 of the discharge voltage with a reference voltage, does not indicate an undischarged primary battery, then the control circuit 54 applies the ripple voltage test in the same manner circuit 51 of the ripple voltage from the charging current in the same manner as described in connection with the embodiment illustrated in FIG. 1. In this event, after the battery 11 has been charged for a predetermined time period, the control circuit 54 compares the sensed value of ripple voltage with a predetermined reference ripple voltage. If the sensed value of ripple voltage is greater than the reference ripple voltage, a primary battery is indicated and the control circuit 54 causes the switch 32 to interrupt the current flow from the charging circuit 10 to the battery 11. The control circuit 54 will hold the charging system in this non-charging mode until the control circuit is reinitialized by replacing the battery 11 and/or removing and then re-applying a-c power.

Immediately after the battery 11 is inserted into the charging system and a-c power is supplied to the charging device 10, the control circuit 54 causes the switch 32 to disconnect the charge current from the battery 11. By initially disconnecting the charge current from the battery 11, the battery voltage may be measured while the battery is being discharged by resistive load 60 without any influence from a charging current. In response to an indication that the sensed discharge voltage is not indicative of a fresh primary battery, the control circuit 54 causes the switch 32 to conduct charging current to the battery 11 whereby the aforementioned comparison of ripple voltage may be accomplished.

Although a particular implementation of that portion of the control circuit 54 which measures and compares discharge voltage is not shown in FIG. 2, it will be appreciated by those skilled in the art that a particular circuit may be designed using component parts which are conventional off the shelf items such as integrated circuit comparators, transistors and resistors. It will also be appreciated by those skilled in the art that a design of a particular circuit for control circuit 54 can be easily implemented using these conventional off the shelf items.

We claim:

1. A battery charging system adapted to distinguish a rechargeable battery type from a non-rechargeable battery type, both said types being of substantially similar size and having first and second external load terminals for delivering electrical energy, said system comprising, in combination:

a battery charging circuit having a first non-charging mode and a second charging mode, said circuit having first and second charging contacts arranged for engagement with the first and second external load terminals respectively of when a battery is connected to the contacts;

sensing means for sensing the value of at least one parameter common to both rechargeable and non-rechargeable batteries, said value for a rechargeable battery differing from said value for a non-rechargeable battery;

enabling means responsive to said sensing means for disabling said charging circuit when said value is indicative of a non-rechargeable battery.

2. The combination as set out in claim 1 in which said parameter is the low frequency impedance of said battery.

3. The combination as set out in claim 1 in which said parameter is the discharge voltage of the battery.

4. The combination as set out in claim 1 in which said charging circuit supplies said rechargeable battery with pulses of charge current and said parameter corresponds to the ripple voltage measured across the first and second external load terminals of said battery.

5. The combination as set out in claim 1 in which said enabling means includes:

reference means for storing a reference value of said parameter, said reference value indicative of a non-chargeable battery;

comparison means for receiving and comparing said stored reference value in said reference means with said sensed value of the parameter sensed by said sensing means; and a switch means for disabling said charging circuit in response to an indication from said comparison means that said sensed value of said parameter sensed by said sensing means is not distinguishable from the reference value stored in said reference means.

6. The combination as set out in claim 5, wherein said sensing means senses a varying ripple voltage appearing across the first and second external load terminals of said battery when charging current is applied to said rechargeable battery by said charging circuit.

7. The combination as set out in claim 1 wherein said sensing means senses a first parameter and a second parameter across said first and second external load terminals of said battery:

said first and second parameters each having values in a rechargeable battery which are distinguishable from such values in a non-rechargeable battery.

8. The combination as set out in claim 7 wherein said enabling means is first responsive to the value of said first parameter from said sensing means for enabling the charging circuit if the first parameter is not indicative of a non-rechargeable battery, and said enabling means thereafter is responsive to said second parameter to disable said charging circuit if said second parameter is indicative of a non-rechargeable battery.

9. The combination as set out in claim 1 in which said enabling means sequentially discharges said battery for a predetermined time period and then charges said battery for a predetermined time period before responding to said sensing means.

10. A battery charging system adapted to distinguish a non-rechargeable battery from a rechargeable battery, both said batteries being of substantially similar size and both having first and second external terminals for delivering electrical energy to a load, said system comprising;
  a charging circuit for delivering charging current to a rechargeable battery, said charging circuit adapted to receive a rechargeable battery and a non-rechargeable battery;
  sensing means for sensing the value of at least one electrical parameter common to said rechargeable battery and said non-rechargeable battery; and
  enabling means responsive to said sensed value for enabling the delivery of charging current to said rechargeable battery by said charging circuit when said sensed value is indicative of a rechargeable battery and for inhibiting the delivery of charging current to a non-rechargeable battery when said sensed value is indicatve of a non-rechargeable battery.

11. The invention as set forth in claim 10 wherein said enabling means includes means for evaluating said value of said at least one electrical parameter and for permitting the enabling of said charging circuit only if said value of said at least one electrical parameter is characteristic of a rechargeable battery.

12. The invention as set forth in claim 11 wherein said enabling means includes a reference value and a comparison means, said comparison means comparing said value of said at least one electrical parameter to said reference value and in response thereto controlling the delivery of charging current to said battery by said charging circuit.

13. The invention as set forth in claim 12 wherein said enabling means includes a switch means responsive to said comparison means for controlling the delivery of charging current by said charging circuit.

14. The invention as set forth in claim 10 further including means for sequentially discharging for a first predetermined time period a battery inserted in said charging circuit and then charging said inserted battery for a second predetermined time period, said sensing means sensing said value subsequent to said second time period whereby said sensed value is more readily useable in determining whether the battery is a rechargeable type or a non-rechargeable type.

15. A method of distinguishing a rechargeable battery type from a non-rechargeable battery type, both said types being of substantially similar size and having first and second external load terminals for deliverying electrical energy, said method comprising the steps of:
  charging a battery at said first and second external load terminals with pulses of charge current;
  sensing a value of a parameter of the battery;
  comparing the sensed value of the parameter with a predetermined reference value; and
  discontinuing the charging of the battery in response to an indication from the comparison of the sensed and predetermined reference values that the battery is a non-rechargeable type.

16. A method as set forth in claim 15 wherein the battery is discharged for a first predetermined time period prior to charging the battery with pulses of charge current.

17. A method as set forth in claim 15 wherein the battery is charged for a predetermined time period prior to comparing the value of the sensed parameter with a predetermined reference value.

18. A method as set forth in claim 16 wherein the battery is charged for a second period of time after said first predetermined period of time and before said comparing step.

19. A method as set forth in claim 15 wherein the charging parameter is the low frequency impedance of said battery.

* * * * *